(12) United States Patent
Kreft

(10) Patent No.: US 6,650,979 B1
(45) Date of Patent: Nov. 18, 2003

(54) SYSTEM FOR CONTROLLING MOTOR VEHICLE COMPONENTS ACCORDING TO THE "DRIVE-BY-WIRE" PRINCIPLE

(75) Inventor: Joerg Kreft, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/088,967

(22) PCT Filed: Sep. 15, 2000

(86) PCT No.: PCT/EP00/09070
§ 371 (c)(1),
(2), (4) Date: Jul. 19, 2002

(87) PCT Pub. No.: WO01/23242
PCT Pub. Date: Apr. 5, 2001

(30) Foreign Application Priority Data

Sep. 25, 1999 (DE) .......................................... 199 46 073

(51) Int. Cl.$^7$ .............................................. A01B 69/00
(52) U.S. Cl. .............................. 701/41; 701/70; 701/71; 303/140; 303/147
(58) Field of Search .............................. 701/41, 70, 71; 303/140, 147, 20, 122.04; 188/158

(56) References Cited

U.S. PATENT DOCUMENTS

| | | |
|---|---|---|
| 4,771,846 A | 9/1988 | Venable et al. ............. 180/422 |
| 5,347,458 A | 9/1994 | Serizawa et al. ............. 701/41 |
| 6,015,193 A * | 1/2000 | Vogel et al. ................. 303/147 |
| 6,213,567 B1 * | 4/2001 | Zittlau et al. ................. 303/20 |

FOREIGN PATENT DOCUMENTS

| | | | |
|---|---|---|---|
| DE | 35 36 563 | 4/1986 | |
| DE | 38 25 280 | 2/1990 | |
| DE | 40 11 947 | 10/1990 | |
| DE | 42 41 849 | 6/1994 | |
| DE | 195 26 250 | 1/1997 | |
| DE | 197 45 377 | 4/1998 | |
| DE | 198 01 393 | 7/1999 | |
| JP | 07267575 | * 10/1995 | ............ B25J/17/00 |
| WO | 89/10865 | 11/1989 | |

* cited by examiner

Primary Examiner—Marthe Y. Marc-Coleman
(74) Attorney, Agent, or Firm—Kenyon & Kenyon

(57) ABSTRACT

A "drive by wire" system reverts to a safe condition if an error affecting safely is identified. The system includes a steerable wheel, a steering device, and control computers linked to sensor(s) which detect movement and position of the steering wheel. The system includes positioning devices mechanically coupled to the steerable wheel and controllable by one of the control computers and majority voting units. The positioning unit is actively controllable by its assigned control computer. The control computers determine their own condition and the condition of the system by model-based calculations, using measured values detected by the sensors and switch over from, the currently active control computer to the control computer assigned to the other positioning unit, if deviations from the model forecasts in a majority of the control computers are indicated.

22 Claims, 3 Drawing Sheets

SYSTEM FOR CONTROLLING MOTOR VEHICLE COMPONENTS ACCORDING TO THE "DRIVE-BY-WIRE" PRINCIPLE

FIELD OF THE INVENTION

The present invention relates to a system for controlling vehicle components, e.g., for steering a vehicle, according to the "Drive by Wire" principle.

BACKGROUND INFORMATION

The fundamental characteristic of a "Drive by Wire" vehicle is that a direct, mechanical connection exists neither between the foot controls and the corresponding components (gas, brake, clutch), nor between the steering wheel and the wheels coupled to it. The control measures taken by the driver are no longer directly converted into mechanical displacements, but are picked up by sensors at the pedals and the steering wheel, electronically processed by control computers, and transmitted as an electrical, controlled variable to the corresponding actuators.

The advantages of a "Drive By Wire" system include, inter alia, the increase in passive safety, since, e.g., the elimination of a steering column excludes it from intruding into the vehicle interior. In addition, the comfort of the vehicle can be improved, because, e.g., it is possible to freely select the restoring torque at the steering wheel and vary the transmission ratio between the steering wheel and the wheels coupled to it. There are also design advantages. This facilitates, for example, the construction of right-hand/left-hand steering designs, as well as their selection, and also facilitates the conversion to driving-school vehicles or disabled-friendly vehicles. Furthermore, "Drive By Wire" systems simplify the system integration of devices such as a vehicle stability control system, anti-lock braking system, traction control system, automatic speed control, etc., which means that the costs can be correspondingly reduced.

On the other hand, a "By Wire" system has, however, the problem that a transition into a safe state is not ensured in the event of a fault in one of its components. In contrast to, e.g., conventional power-assisted steering, which still retains the basic steering function in the event of a fault that leads to the failure of the servo assistance of the steering, the malfunction of a component in a "By Wire" system can have fatal consequences if design or conceptional safety measures are not taken.

A hydraulic steering device is described in U.S. Pat. No. 4,771,846. The hydraulic steering device is supplied with pressurized hydraulic fluid by a pump, via a proportional valve. The proportional system is controlled with the aid of an electromagnet, using signals picked up by a steering-angle sensor. In this context, the proportional valve is controlled so that the value specified by the steering-angle sensor is set at the steered wheels. In this case, it is disadvantageous that the entire steering system fails when the proportional valve ceases to operate.

A further steering system is described in German Published Patent Application No. 35 36 563, where the movement of a steering handwheel starts an electric motor, using switching electronics. The electric motor drives a pump, which is connected to working chambers of a working cylinder. In this context, the rotational direction of the pump determines the direction in which the working cylinder is displaced. This system is also not redundant and runs the risk of complete failure.

In addition, German Published Patent Application No. 40 11 947 describes a steering system for two steerable wheels, where the wheels can be steered independently of each other. The individual wheels are driven by a servomotor, which is powered by an electronic control unit. In this case, there is also the danger of the vehicle no longer being steerable in response to the servomotor or the electronic control unit failing.

A steering system, which controls at least two independent motors with the aid of at least two independent control units, is described in German Published Patent Application No. 42 41 849. Safe operation is ensured by fault monitoring and redundancy in the motors. A fault-monitoring device prevents a defective control unit from controlling the steering elements. However, it is disadvantageous that incorrect steering is triggered by any undetected faults in the control units.

It is an object of the present invention to provide a "Drive By Wire" system, e.g., for steering a vehicle, which passes over into a safe operating state in the event of one of its components malfunctioning in a manner that is critical with regard to safety.

SUMMARY

This object is achieved by providing a system as described herein. One example embodiment of the system of the present invention accordingly includes at least one steerable wheel, a steering wheel or equivalent steering device, an odd number of more than one intercommunicating control computers which are each connected to at least one first sensor detecting a movement or actuation of the steering wheel or steering device and to at least one second sensor directly or indirectly detecting the position of the at least one steerable wheel, a first actuator and a second actuator which are each mechanically coupled to the at least one steerable wheel and may each be controlled by one of the control computers, a first voter-basis discriminator that is assigned to the first actuator, and a second voter-basis discriminator that is assigned to the second actuator. Each of the control computers transmits a first signal to the first voter-basis discriminator and a second signal different from the first signal to the second voter-basis discriminator. The actuator, the assigned voter-basis discriminator of which receives the first signal from the majority of the control computers, is actively controllable by its assigned control computer. Using model calculations and the measured values acquired by the sensors, the control computers ascertain their own state and the state of the system and, in each case, effect a switchover from the active control computer to the control computer assigned to the other actuator if the system function shows deviations from the model expectations of a majority of the control computers.

Therefore, the system components that are critical with regard to safety are configured with redundancy so that, in the case of a malfunctioning component, the system automatically switches over to a corresponding component that works correctly. In the control computers, a routine may be implemented which allows each controlling, control computer to formulate and transmit a switchover request to the other control computers, whereby the other control computers change their signals received by the voting-basis discriminators, so that another control-enabled control computer assumes control in the system, by then controlling the actuator assigned to it.

An example embodiment of the system according to the present invention provides for the control computers intercommunicating via a CAN bus. This may be advantageous, since a CAN bus operates in a substantially fault-tolerant manner, and independently of the CPU.

Another example embodiment of the system according to the present invention is characterized in that the actuators each possess a hydraulic control unit having a double-acting steering cylinder, the two cylinder chambers of each steering cylinder being interconnectable by a steering bypass valve. In each case, this arrangement may allow one of the redundant steering cylinders to be switched on or switched off in a simple and reliable manner. In this context, the voter-basis discriminators control the steering bypass valves and thus establish which hydraulic circuit is active at any one time.

Another example embodiment of the present invention provides for the pressure in each of the two cylinder chambers of the dual-acting steering cylinder being adjustable, using a proportional valve, a separate pressure sensor being connected to each of the two cylinder chambers. In this context, each steering cylinder may be assigned its own pump for providing the necessary supply pressure.

The outlet of the pump may be connected to a pressure reservoir, via a non-return valve. Therefore, the pump may not be continuously run during the operation of the vehicle. Along these lines, a pressure sensor may be provided for measuring the supply pressure, the pump being limited by the actively-controlling control computer in response to a predefined pressure value being reached.

In addition, a branch leading into a hydraulic-fluid tank may be connected to a pump bypass valve, between the outlet of the pump and the non-return valve. This allows the pump to start up without counterpressure from the system. In the case of an electric pump, this may prevent high starting currents.

A further example embodiment according to the present invention provides for one of the control computers controlling a steering-torque motor connected to the steering wheel, in order to simulate a restoring torque. In this context, the pressure difference between the two cylinder chambers of the double-acting steering cylinder is used as a basis for calculating the restoring torque at the steering wheel.

The system of the present invention may include a brake system, as well. The system may additionally include: a brake-pedal mechanism; a first wheel-brake cylinder and a second wheel-brake cylinder, which each belong to different brake circuits that each have a hydraulic control unit; as well as a number of third sensors corresponding to the odd number of more than one control computers; each third sensor detecting the position of the brake pedal and being connected to one of the control computers, so that each brake circuit is assigned a different control computer, by which the corresponding brake circuit may be controlled according to the "Brake By Wire" principle. In this case, the control computers and voting-basis discriminators present for the steering, as well as parts of the hydraulics, may be used for the brake system as well.

The brake system may be divided into two brake circuits that are independent of each other, each brake circuit having two wheel-brake cylinders, of which the one wheel-brake cylinder is assigned to a front wheel and the other wheel-brake cylinder is assigned to a rear wheel on the opposite side of the vehicle.

The present invention is explained in detail below with reference to Figures that represent an exemplary embodiment.

DETAILED DESCRIPTION

Figure 1:
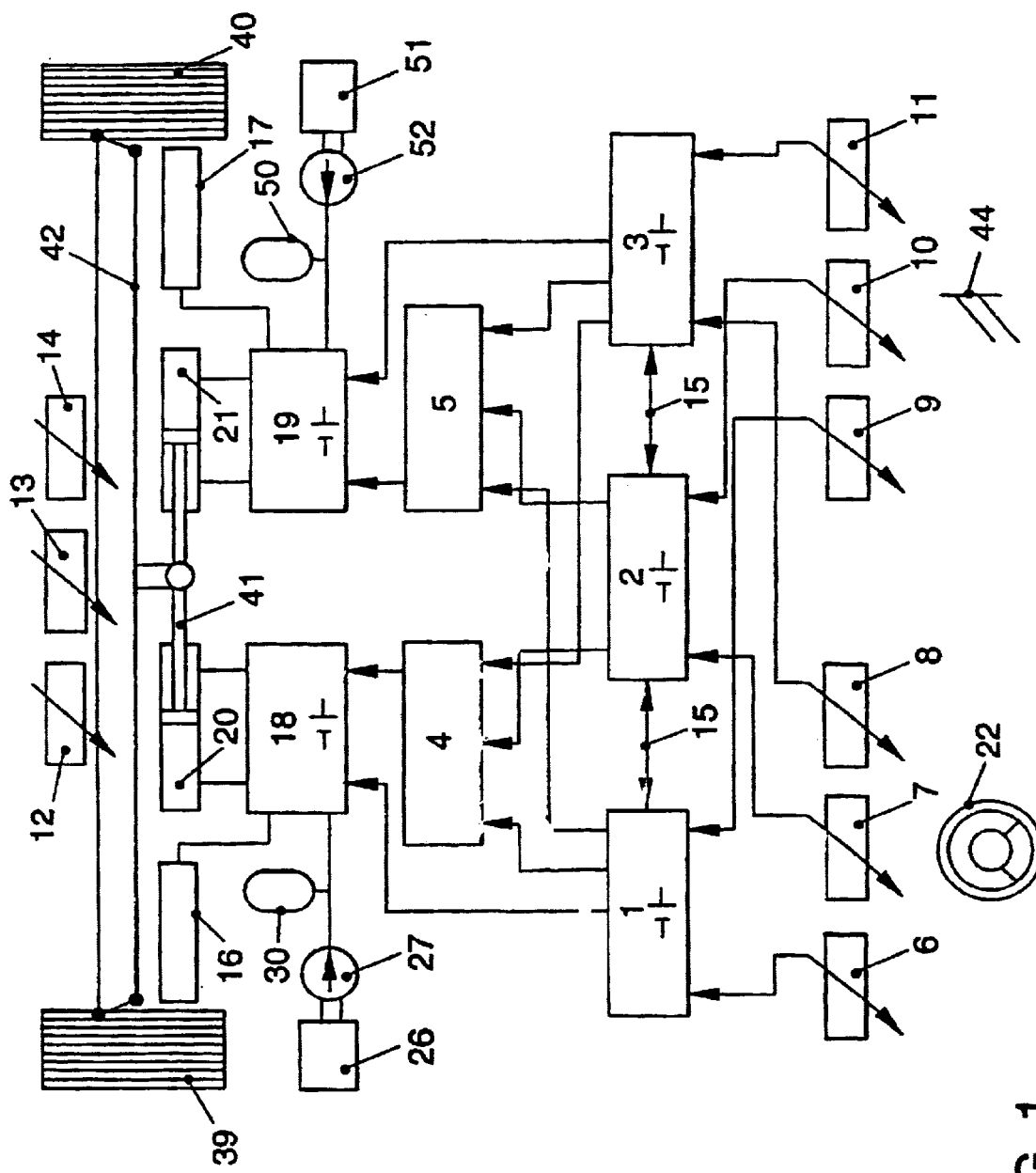
FIG. 1 is a schematic view of a system according to the present invention, for electrohydraulically steering and braking a vehicle according to the "Drive By Wire" principle.

The "Drive By Wire" system schematically illustrated in the Figures includes two subsystems, namely, a steering system and a brake system. Therefore, the "Steer By Wire" and "Brake By Wire" subsystems differ from a functional standpoint. The actuators for steering and braking are both present in duplicate so that, in response to the failure of one actuator, the system may switch over to the other.

Three intercommunicating control computers 1, 2, 3 and two voter-basis discriminators 4, 5, which are also referred to as "voters", form the center point of the system illustrated. Each of the control computers 1, 2, 3 is equipped with its own sensors 6, 9, 12; 7, 10, 13; 8, 11, 14 in order to pick up the control taken by the driver, using the steering wheel and the brake pedal, and to detect the steering angle of the wheels. In addition, sensors are present for detecting the power-supply state. In this context, each of the control computers also has its own auxiliary power supply. A CAN bus 15, which functions in a substantially fault-tolerant and CPU-independent manner, is used for communication between control computers 1, 2, 3.

Control computers 1 and 3 have control over their own hydraulic steering and brake circuits. Either just the circuit of control computer 1 or just the circuit of control computer 3 is active with regard to the steering, whereas two brake circuits may be always used. Control computer 1 controls the left front (reference numeral 16) and right rear wheel-brake cylinders, while control computer 3 correspondingly controls the front right (reference numeral 17) and left rear wheel-brake cylinders, so that, in case a brake circuit fails, the basic functioning of the brakes may still be ensured. Reference numerals 18 and 19 each designate a hydraulic control unit, to which, in addition to the wheel-brake cylinders of a brake circuit, a double-acting steering cylinder 20 and 21 is connected, respectively.

On one hand, control computer 2 is used as a control computer for the two control-capable computers 1 and 3 and therefore allows, for the first time, a voter-basis decision in voter 4 and 5. On the other hand, it controls a steering-torque motor that simulates a restoring torque on steering wheel 22.

Voter-basis discriminators (voters) 4, 5 control steering bypass valves 23 (cf. FIG. 2) and thus stipulate, which hydraulic steering circuit is currently active. Each of the two voter-basis discriminators 4, 5 receives a 1-bit input signal from each of the three control computers 1, 2, 3. From the point of view of the specific control computer i, the two signals that it outputs to voter-basis discriminators 4, 5 are the inverse of each other, i.e., it either transmits a low signal ($E_{1i'}=0$) to voter-basis discriminator 4 and a high signal ($E_{2i'=E1i'}=1$) to voter-basis discriminator 5, or vice versa. Therefore, first subscripts (i) are omitted below.

Voter-basis discriminators 4, 5 determine their output signal $A_1$ and $A_2$ in accordance with their input variables $E_1$ through $E_3$ and $$\neg E_1$$

through $$\neg E_3$$

from the following equations:

$$A_1 := (E_1 \wedge E_2) \vee (E_2 \wedge E_3) \vee (E_1 \wedge E_3)$$

$$A_2 := (\neg E_1 \wedge \neg E_2) \vee (\neg E_2 \wedge \neg E_3) \vee (\neg E_1 \wedge \neg E_3)$$

Therefore, in each case, the hydraulic steering circuit, the corresponding voter-basis discriminator 4 or 5 of which receives a high signal from at least two control computers, is active. Each control computer may determine which one of them is actively in control at the very moment, by exchanging status data via CAN bus 15.

Control computers 1, 2, 3 may include microcontrollers. The control software includes a plausibility check, which identifies faults in the actuators. To this end, the driver's command, i.e., the control command issued by the driver, using the steering wheel and/or the brake pedal, is on one hand transmitted to the specific actuator system and, on the other hand, used in model calculations in the control computers. The values supplied by the model calculations are compared to the measured values of the actuator system. If the measured values of the actuator system are inside a specifiable tolerance range, then the actuator system is functional.

The control software is configured to classify an occurring fault with regard to its effect on the entire system, i.e., it is determined if the fault or faults are tolerable or endanger the operational safety of the vehicle.

The reaction to tolerable faults may be, for example, observation and/or recording of the fault, restoration to a known, fault-free, previous state, or calculation of a fault-free, follow-up state with the aid of a model.

Control computers 1, 2, 3 work with algorithms for checking or evaluating the current state of the vehicle and the "Drive By Wire" system. In particular, the checking includes test routines for the actuators, the sensory system, and the voltage supply.

A catalog of measures, which defines the reactions to all detectable, initial faults, is stored in each control computer 1, 2, 3. The system of the present invention is configured so that, in the case of a fault that is critical with regard to safety, it is still possible to safely pass over into a safe state. In response to the occurrence of a fatal fault, i.e., a fault endangering the safety of operation, this safe state may only be reachable when, in addition to sending optical and/or acoustic instructions to the driver, the trip is forcibly ended by active intervention such as vehicle deceleration, by slowly and continuously braking.

A routine, which allows controlling computer 1 or 3 to formulate a switchover function for switching over to the two other control computers 2, 3 or 1, 2, may be implemented in the control software. This causes its voter signals to be modified, so that the other control-capable computer (1 or 3) assumes control. This may be necessary for the mentioned hydraulics test routines, which are performed in every driving pause. The detection of a driving pause and the end of a trip is likewise based on a voter-basis decision and is initiated, in each case, by the controlling computer.

Each control computer may determine its own state, as well as that of the system, from the measured values picked up by the sensors and the above-mentioned model calculations, which, e.g., with regard to the steering, take into account the relationship between the steering-wheel angle and the angle of the wheel as a function of the pressures in the steering-cylinder chambers. If at least two control computers determine that the system performance is deviating from their model expectations, then they may suspend the operation of the currently active, controlling computer and thus force a switchover to the second hydraulic steering circuit, by changing their signals sent to voter-basis discriminator (voter) 4, 5.

The configuration and the function of the "Steer By Wire" and "Brake By Wire" subsystems are explained in detail below. The "Steer By Wire" subsystem includes a steering-wheel module and steering hydraulics. In this context, the steering-wheel module includes steering wheel 22, the steering-torque motor, and three sensors 6, 7, 8, which each detect the steering-wheel angle.

Figure 2:
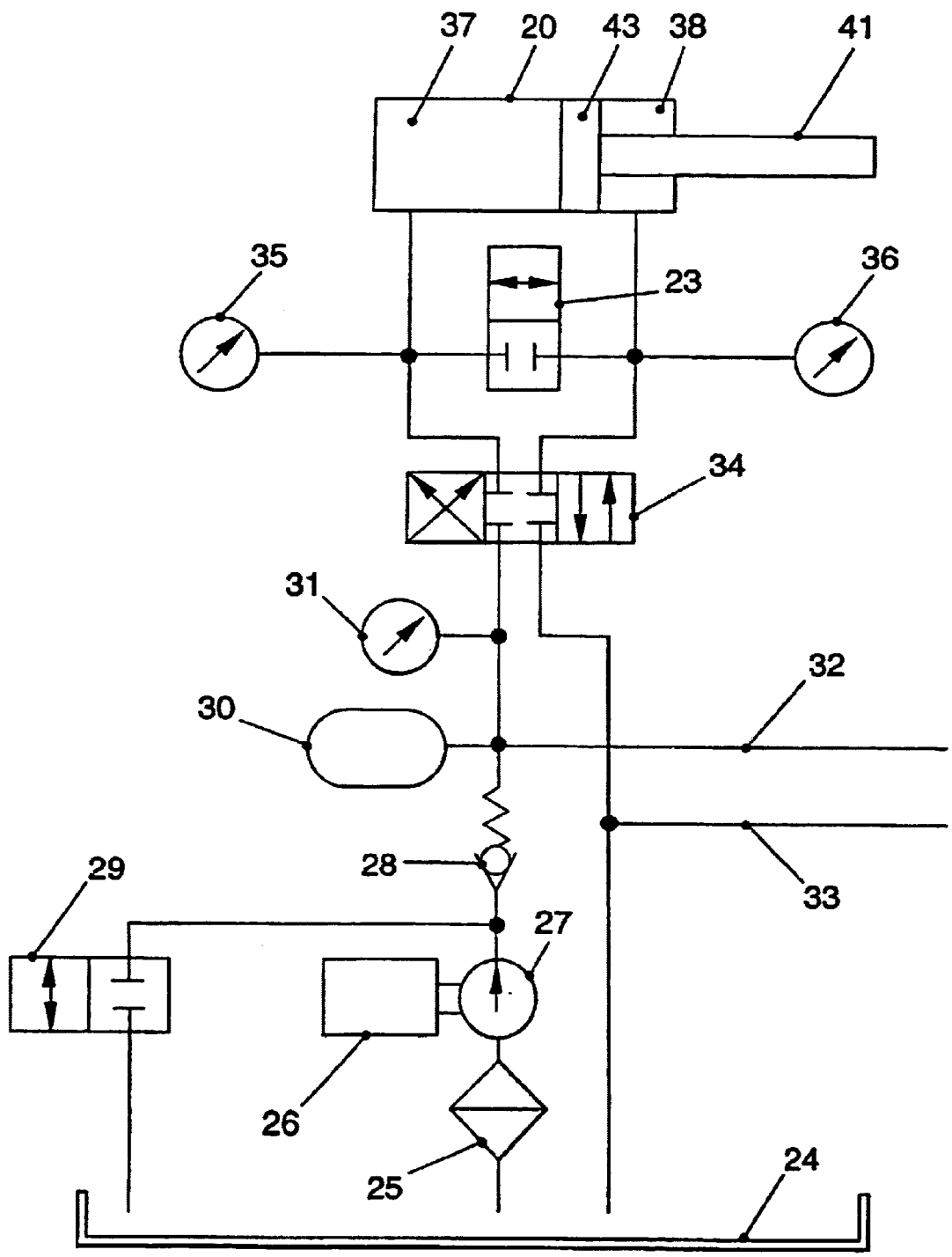
FIG. 2 is a schematic view of the components of the steering hydraulics used in the system illustrated in FIG. 1.

The steering hydraulics of each hydraulic steering circuit is divided into two sections (cf. FIG. 2). The first section is used to provide the supply pressure and includes a hydraulic-fluid tank 24, a filter 25, a pump 27 driven by an electric motor 26, a non-return valve 28, a pump bypass valve (2/2 directional control valve) 29, a reservoir 30, and a pressure sensor 31 for measuring the supply pressure.

Pump 27 conveys hydraulic fluid from tank 24 through non-return valve 28, into reservoir 30. If a predefined, maximum supply pressure is reached, then pump 27 is limited or shut off, using suitable software. If the supply pressure falls below a predefined, minimum supply pressure, then pump 27 is switched on again. Non-return valve 28 prevents the pressure from falling in the direction of tank 24. In the open state, pump bypass valve 29 is used to allow pump 27 to start up without counterpressure from the system. The supply pressure built up in reservoir 31 is used for both the steering and the brake. Thus, the line illustrated in FIG. 2 assigned the reference numeral 32 leads to the brake hydraulics, while reference numeral 33 refers to the return line from the brake hydraulics to tank 24.

The second section of the steering hydraulics includes a double-acting steering cylinder 20, a proportional valve (3/4 directional control valve) 34, a steering bypass valve (2/2 directional control valve) 23, and two pressure sensors 35, 36, which are each connected to one of the two cylinder chambers 37, 38, respectively, of steering cylinder 20.

In addition, three sensors 12, 13, 14 are present for measuring the wheel angle (cf. FIG. 1). In this context, sensors 12, 13, 14 measure the angle of wheels 39, 40 indirectly, by sensing the position of steering-cylinder piston rod 41, of a tie rod 42, or of a steering rod.

If steering bypass valve 23 is closed, then a pressure may be selectively built up in each of the two steering-cylinder chambers 37, 38, via proportional valve 34. Piston rod 41 of steering cylinder 20 moves to the left or right as a function of the difference of these two pressures, and thus transmits the steering movement to wheels 39, 40. The pressure difference between the two steering-cylinder chambers 37, 38 forms the basis for calculating the restoring torque generated at steering wheel 22 by the steering-torque motor. Since control computer 2 does not measure the pressure difference itself, this value is transmitted via CAN bus 15.

The generated restoring torque gives the driver a driving feel, which is dependent on the specific driving situation. Thus, the restoring torque at steering wheel 22 is, for example, markedly less in the case of driving on a smooth, slippery road, than in the case of driving on a relatively rough or dry road. Therefore, it is possible to inform the driver of a looming, critical driving situation in a tactile manner, using the restoring torque generated at steering wheel 22 by the steering-torque motor. Various sensors, in particular pressure sensors, temperature sensors, slip sensors, and/or optical sensors, may be used to detect such situations.

The pressure difference between the two cylinder chambers 37, 38 is eliminated by opening steering bypass valve 23. This switches the steering cylinder in question to passive. In this case, the other steering cylinder takes over the adjustment of the wheel angle, while the piston 43 of the passively-switched steering cylinder, which is mechanically connected to tie rod 42 by the piston rod 41 of the other steering cylinder, follows along powerlessly.

Figure 3:
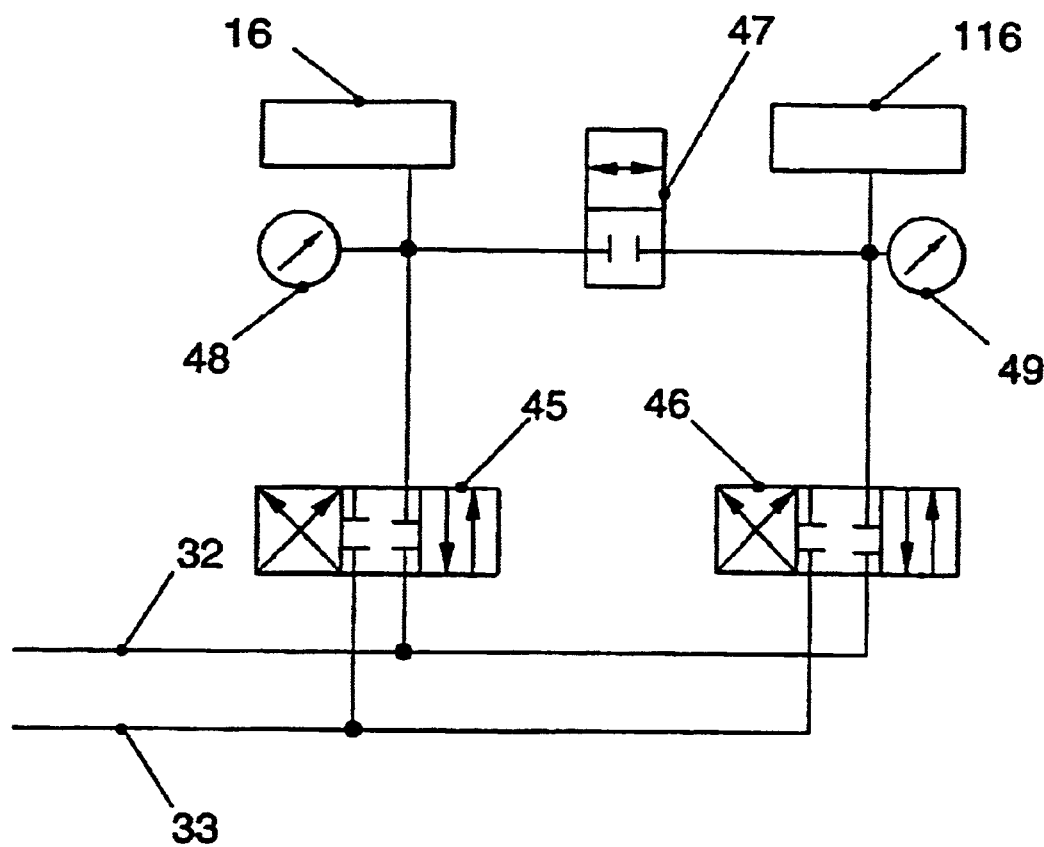
FIG. 3 is a schematic view of the components of the brake hydraulics used in the system illustrated in FIG. 1.

The "Brake By Wire" subsystem is made up a brake-pedal mechanism and brake hydraulics (cf. FIGS. 1 and 3).

The brake-pedal mechanism simulates the counterpressure of conventional brake hydraulics, using springs. Three springs adjusted to each other press against brake pedal 44 as a function of the position of brake pedal 44. This gives the driver the usual feel of conventional brake hydraulics.

In each instance, the braking hydraulics (cf. FIG. 3) assigned to one of the two control computers 1, 3 include: two wheel-brake cylinders, i.e., left front (16) and right rear (116), and right front and left rear, respectively; two proportional valves (3/3 directional control valves) 45, 46, which are assigned to one of the wheel-brake cylinders 16, 116, respectively; a brake bypass valve (2/2 directional control valve) 47, via which the cylinder chambers of wheel-brake cylinders 16, 116 may be interconnected; and two pressure sensors 48, 49 connected to the cylinder chambers of wheel-brake cylinders 16, 116, respectively.

In addition, the wheel speeds are detected by two sensors. These sensors are part of an anti-lock braking system and/or a traction control system.

If steering bypass valve 47 is closed, then a different pressure may be built up in each wheel-brake cylinder 16, 116, using proportional valve 34. Pressure sensors 48, 49 detect these pressures. The separate control of all four wheel-brake cylinders by control computers 1, 3 allows an anti-lock braking system to be realized.

If, however, brake bypass valve 47 is opened, then the pressure in the two wheel-brake cylinders 16, 116 is equalized, i.e., the two wheels (front wheel and rear wheel) are equally decelerated. This characteristic is used in test routines to check the two pressure sensors 48, 49 against supply-pressure sensor 31 (cf. FIG. 2), for unacceptable deviations.

The present invention is not limited to the exemplary embodiment illustrated in the Figures. and described above. But rather, a number of variants making use of the inventive idea are possible, even when the arrangement deviates from the present invention. Thus, the system of the present invention may have, for example, an arrangement by which the ratio of the steering-wheel movement to the steering movement of wheels 39, 40 may be adjusted. The ratio may be varied as a function of the driving situation, e.g., for a parking maneuver or traveling on an expressway.

Furthermore, it is useful to combine the system with an electronic vehicle immobilizer, since the mechanical decoupling of steering wheel 22 and steerable wheels 39, 40 eliminates the need for a conventional steering-column lock.

List of reference numerals 1 control computer
2 control computer
3 control computer
4 voter-basis discriminator (voter)
5 voter-basis discriminator (voter)
6 sensor for detecting the steering-wheel angle
7 sensor for detecting the steering-wheel angle
8 sensor for detecting the steering-wheel angle
9 sensor for detecting the position of the brake pedal
10 sensor for detecting the position of the brake pedal
11 sensor for detecting the position of the brake pedal
12 sensor for detecting the steering angle, e.g., wheel angle
13 sensor for detecting the wheel angle
14 sensor for detecting the wheel angle
15 can bus
16 front wheel-brake cylinder
17 front wheel-brake cylinder
18 hydraulic control unit
19 hydraulic control unit
20 steering cylinder
21 steering cylinder
22 steering wheel
23 steering bypass valve
24 hydraulic-fluid tank
25 filter
26 electric motor
27 pump
28 non-return valve
29 pump bypass valve
30 reservoir
31 supply-pressure sensor
32 line to the brake hydraulics
33 return line
34 proportional valve
35 pressure sensor
36 pressure sensor
37 steering-cylinder chamber
38 steering-cylinder chamber
39 wheel
40 wheel
41 steering-cylinder piston rod
42 tie rod
43 steering-cylinder piston
44 brake pedal
45 proportional valve
46 proportional valve
47 brake bypass valve
48 pressure sensor
49 pressure sensor
50 reservoir
51 electric motor
52 pump
116 rear wheel-brake cylinder

What is claimed is:

1. A system for controlling vehicle components, comprising:

at least one steerable wheel;

one of a steering wheel and a steering device;

an odd number of more than one intercommunicating control computers, each connected to at least one first sensor configured to detect one of a movement and an actuation of the one of the steering wheel and the steering device and connected to at least one second sensor configured to detect a position of the at least one steerable wheel;

a first actuator;

a first voter-basis discriminator assigned to the first actuator;

a second actuator; and a second voter-basis discriminator assigned to the second actuator;

wherein, in accordance with model calculations and measured values acquired by the first sensor and the second sensor, each of the control computers is configured to ascertain a corresponding state and a state of the system and, in each case, to effect a switchover from an active control computer to a control computer assigned to another actuator, if the system function shows deviations from model expectations of a majority of the control computers;

wherein each of the control computers is configured to transmit a first signal to the first voter-basis discriminator and a second signal different from the first signal to the second voter-basis discriminator, the first actuator and the second actuator mechanically and respectively coupled to the at least one steerable wheel, the first actuator and the second actuator configured to be controlled by one of the control computers, and one of the first actuator and the second actuator, corresponding to the voter-basis discriminator that receives the first signal from a majority of the control computers, configured to be actively controlled by a corresponding control computer 15.

2. The system according to claim 1, wherein the control computers are configured to intercommunicate via a CAN bus.

3. The system according to claim 1, wherein the control computers are configured to determine a current steering-wheel angle in accordance with the first sensors.

4. The system according to claim 1, wherein each actuator includes a hydraulic control unit having a double-acting steering cylinder.

5. The system according to claim 4, further comprising a steering bypass valve configured to interconnect two cylinder chambers of the double-acting steering cylinder.

6. The system according to claim 4, further comprising a proportional valve configured to adjust specific pressure in two cylinder chambers of the double-acting steering cylinder.

7. The system according to claim 4, further comprising a separate pressure sensor connected to each of two cylinder chambers of the double-acting steering cylinder.

8. The system according to claim 4, further comprising a pump assigned to the hydraulic control unit, the pump configured to provide supply pressure.

9. The system according to claim 8, wherein an outlet of the pump is connected to a pressure reservoir by a non-return valve.

10. The system according to claim 9, further comprising a branch, which includes a pump bypass valve and is configured to empty into a hydraulic-fluid tank, connected between the outlet of the pump and the non-return valve.

11. The system according to claim 8, further comprising at least one pressure sensor configured to detect the supply pressure, the control computer having active control configured to limit the pump as a function of the detected pressure value.

12. The according to claim 4, further comprising a steering-torque motor connected to the steering wheel, one of the control computers configured to control the steering-torque motor to simulate a restoring torque, a restoring torque to be generated at the steering wheel by the steering-torque motor calculated in accordance with a pressure difference between two cylinder chambers of the double-acting steering cylinder.

13. The system according to claim 1, further comprising a steering-torque motor connected to the steering wheel, one of the control computers configured to control the steering-torque motor to simulate a restoring torque.

14. The system according to claim 1, further comprising an independent power-supply device corresponding to the control computers and the first and second sensors.

15. The system according to claim 1, wherein the control computers are configured to implement a routine configured to allow a first controlling control computer to formulate and transmit a switchover request to other control computers, whereby the other control computers change the signals received by the voting-basis discriminators, so that a different control-enabled control computer assumes control in the system, by then controlling the actuator assigned to the first controlling computer.

16. The system according to claim 15, wherein the brake-pedal mechanism includes at least one spring configured to simulate a counterpressure of brake hydraulics.

17. The system according to claim 1, further comprising:
a brake-pedal mechanism;
at least one brake circuit including at least one first wheel-brake cylinder, at least one second wheel-brake cylinder and a hydraulic control unit;
at least one third sensor corresponding to the odd number of more than one control computers, each of the at least one third sensor configured to detect a position of the brake pedal and connected to one of the control computers, and each of the at least one third sensor assigned a different control computer by which the corresponding brake circuit is controllable according to a brake by wire principle.

18. The system according to claim 17, wherein the at least one brake circuit includes two brake circuits that are independent of each other, each brake circuit including two wheel-brake cylinders, of which a first wheel-brake cylinder is assigned to a front wheel and a second wheel-brake cylinder is assigned to a rear wheel on an opposite side of the vehicle.

19. The system according to claim 18, wherein cylinder chambers of the two wheel-brake cylinders of a brake circuit are connectable, via a separate proportional valve, to one of a pump and a return line connected to a hydraulic-fluid tank.

20. The system according to claim 18, further comprising a steering bypass valve configured to interconnect cylinder chambers of the two wheel-brake cylinders of a brake circuit.

21. The system according to claim 15, further comprising a separate pressure sensor connected to cylinder chamber of each wheel-brake cylinder.

22. The system according to claim 1, wherein the system is configured to control the vehicle components according to a drive by wire principle.

* * * * *